Oct. 23, 1956 J. BJORKSTEN 2,767,519
METHODS FOR TREATING GLASS FIBERS
Filed May 12, 1952
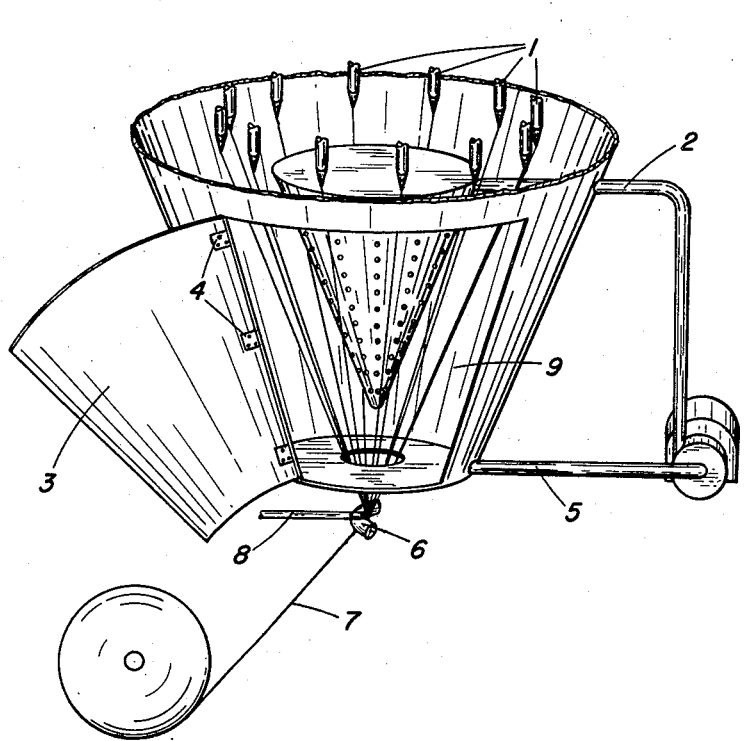
INVENTOR.
JOHAN BJORKSTEN
BY
Attorney

United States Patent Office 2,767,519
Patented Oct. 23, 1956

2,767,519
METHODS FOR TREATING GLASS FIBERS

Johan Bjorksten, Madison, Wis.

Application May 12, 1952, Serial No. 287,375

6 Claims. (Cl. 49—77)

This invention relates to methods for treating glass fibers and more particularly, to glass fibers having a high affinity to resins employed for making glass filled laminates.

Heretofore, glass fibers had been treated with various agents in the spinning operations, such as, for example, starch, water surface active agents, including cation active agents, polyethylene oxide condensate products, and the like. In order to apply to them, materials adapted to increase the moisture resistance or the adhesion to the resins, the fibers, and the cloth made therefrom, have been treated with various solutions, including vinylchlorosilane in solution.

An object of this invention is to apply directly, in the manufacture of the glass fibers, a treatment rendering these glass fibers optimally receptive to adhesion with treatment materials.

In accordance with my invention, I expose the fibers immediately after their formation to a vinyl derivative in gaseous form, so that this vinyl derivative immediately becomes absorbed onto the fibers, and I then apply a size, which may be either a lubricating size of starch base or preferably a size comprising a suspension of resin particles which will be in itself compatible with any later superimposed resinous material.

To further illustrate the invention, reference is made to the drawing, which is an elevational perspective drawing, partly in cross-section. 1 represents an annular arrangement 1 of nozzles, from which the glass fiber is drawn. From each nozzle a fiber passes into a vapor space, into which the vapor of the treating agent, for example, vinyltrichlorosilane, is pumped through a tube 2 into a vapor space through which the fibers are passing when drawn. In this vapor space 9, which they enter immediately upon drawing, they will combine with the vinyltrichlorosilane, which thus becomes directly attached to the fibers.

This vapor space is partly confined by means of an openable jacket 3, which can be opened on hinges 4 when desired, for example, to mend or to correct a break of one of the fibers. Underneath the jacket is a suction tubing 5, which will take the vapors which receive a downward momentum from the downward travel of the fiber and return these chlorosilane vapors through the pump to the said vapor space. The fibers are gathered on a holder 6, from which they proceed as a strand 7.

8 is a supply pipe for a sizing agent which may be starch or any other suitable lubricant and parting agent, but preferably is a suspension of a resin, such as, for example, a polystyrene or polymethacrylate suspension, or the like.

While reference has been made specifically to certain mechanical arrangements, it is apparent that the basic thought is to treat the fibers immediately on their emergence from the spinning jets by means of a vapor of a reagent which becomes firmly attached to the fibers by chemical reactions or surface active forces, and which is capable of participating in the condensation of polymerization resins subsequently superimposed.

Such treatment agents may be vinyltrichlorosilane, divinyldichlorosilane, or any other vinylhalo silane, as well as any other polar vinyl compound such as vinylchloride, vinylethylene chloride, or vinyl octyl alcohol, divinyl ether, vinyl octyl ether, vinyl alcohol, vinyl glycidyl ether, phenyl vinyl ether, vinyl methyl ether, vinyl dichlorobenzene, vinyl sulfide, vinyl cyanide, vinyl mercaptan, and the like. However, vinylhalo silanes are the preferable embodiment.

It is thus seen that the invention is broad in scope and is not to be restricted except by the claims, in which it is my intention to claim all novelty inherent in this invention as broadly as possible, in view of prior art.

Having thus disclosed my invention, I claim:

1. The process for treating glass fibers to improve the adhesivity thereto of synthetic resins, comprising the step of applying to newly formed continuously-moving glass fibers immediately after their emergence from spinning jets the vapor of a vinyl silane then applying a non-gaseous lubricating sizing material thereto and gathering said fibers into a strand.

2. The process for treating glass fibers to improve the adhesivity thereto of synthetic resins, comprising the step of introducing the vapor of a vinyl silane into the area surrounding newly-formed continuously-moving glass fibers between the points of emergence of said fibers from the spinning orifices and the points of first contact of said fibers with gathering means then applying a non-gaseous lubricating sizing material thereto and gathering said fibers into a strand.

3. The process for treating glass fibers to improve the adhesivity thereto of synthetic resins, comprising the step of applying to newly formed continuously-moving glass fibers immediately after their emergence from spinning jets the vapor of a vinyl halosilane then applying a non-gaseous lubricating sizing material thereto and gathering said fibers into a strand.

4. The process for treating glass fibers to improve the adhesivity thereto of synthetic resins, comprising the step of introducing the vapor of a vinyl halosilane into the area surrounding newly-formed continuously-moving glass fibers between the points of emergence of said fibers from the spinning orifices and the points of first contact of said fibers with gathering means then applying a non-gaseous lubricating sizing material thereto and gathering said fibers into a strand.

5. The process for treating glass fibers to improve the adhesivity thereto of synthetic resins, comprising the step of applying to newly formed continuously-moving glass fibers immediately after their emergence from spinning jets the vapor of a vinyl trichlorosilane then applying a non-gaseous lubricating sizing material thereto and gathering said fibers into a strand.

6. The process for treating glass fibers to improve the adhesivity thereto of synthetic resins, comprising the step of introducing the vapor of a vinyl trichlorosilane into the area surrounding newly-formed continuously-moving glass fibers between the points of emergence of said fibers from the spinning orifices and the points of first contact of said fibers with gathering means then applying a non-gaseous lubricating sizing material thereto and gathering said fibers into a strand.

References Cited in the file of this patent
UNITED STATES PATENTS

| 2,306,222 | Patnode | Dec. 22, 1942 |
|---|---|---|
| 2,420,912 | Hurd | May 20, 1947 |
| 2,439,689 | Hyde | Apr. 13, 1948 |